(12) United States Patent
Räsänen et al.

(10) Patent No.: US 7,042,844 B2
(45) Date of Patent: May 9, 2006

(54) FLEXIBLE DATA RATE CHANGE IN A MOBILE NETWORK

(75) Inventors: Juha Räsänen, Espoo (FI); Mikko Ohvo, Numminen (FI)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 10/026,682

(22) Filed: Dec. 21, 2001

(65) Prior Publication Data

US 2002/0093914 A1   Jul. 18, 2002

Related U.S. Application Data

(63) Continuation of application No. PCT/EP99/04328, filed on Jun. 22, 1999.

(51) Int. Cl.
H04J 3/07 (2006.01)
H04J 3/22 (2006.01)

(52) U.S. Cl. .................. 370/232; 370/465; 370/505

(58) Field of Classification Search ........ 370/229–230, 370/232, 310, 328–329, 528, 259, 543, 545, 370/437, 465, 474, 470–471, 505–506, 237, 370/442
See application file for complete search history.

(56) References Cited

U.S. PATENT DOCUMENTS 4,387,459 A    6/1983  Huffman ................... 370/102
5,901,135 A *  5/1999  Chung et al. .............. 370/207
6,069,883 A *  5/2000  Ejzak et al. ............... 370/335
6,108,348 A *  8/2000  Strunk ...................... 370/465
6,128,322 A * 10/2000  Rasanen et al. ........... 370/536

FOREIGN PATENT DOCUMENTS

WO   9627959   9/1996
WO   9627960   9/1996
WO   9712490   4/1997

* cited by examiner

*Primary Examiner*—John Pezzlo
*Assistant Examiner*—Saba Tsegaye

(57) ABSTRACT

The present invention discloses a network system, in which data is transmitted in the form of transmission frames, the system including a network control unit (4) for controlling communication in the network and a terminal (2) for receiving and transmitting data from/to the network control unit (4). When the network control unit (4) receives a request for changing from a first user data rate to a second user data rate it adds/deletes fill data (FD) to/from a transmission frame corresponding to the requested change in the user data rate for transmitting data to the terminal (2) at the second user data rate. The terminal (2) detects the change in the amount of fill data (FD) and changes the user data rate transmitted to the network control unit (4) according to the detected change. In this system, it is possible to smoothly change the data rate without affecting the quality of service.

14 Claims, 4 Drawing Sheets

FLEXIBLE DATA RATE CHANGE IN A MOBILE NETWORK

CROSS-REFERENCE TO RELATED APPLICATION

This application is a continuation of International Application PCT/EP99/04328 having an international filing date of Jun. 22, 1999 and from which priority is claimed under all applicable sections of Title 35 of the United States Code including, but not limited to, Sections 120, 363 and 365(c).

BACKGROUND OF THE INVENTION

1. Field of the Invention

The present invention relates to a network system and to a network control method by which a data rate can be changed.

2. Discussion of Related Art

In a general network in which data are transmitted, it is desirable to vary the data rate according to the condition of the network. For example, not all devices connected to the network are able to communicate using the same data rate, some older devices may have to use a slower data rate than newer devices. Furthermore, the data rate could be changed according to the load on the network. Another reason for changing the data rate is a connection to a second network in which another data rate is used.

Especially in case of a mobile telecommunication network, changing of the data rate should be effected such that the data transmission is not disrupted. Otherwise, the data rate change would worsen the quality of service.

Recently modems have been proposed which are able to effect a seamless data rate change. That is, such modern modems, e.g., ITU-T V.34, can (re)negotiate the data rate, i.e., upgrade and downgrade the data rate, during the call. This feature is useful in the beginning of the call in order to adapt to the prevailing conditions, or even during the call to optimize the throughput by adapting to changing conditions.

ITU-T modem recommendation V.34, annex A, describes a Seamless Rate Change method. In this method the modems change the line rate without disrupting the data transmission for training sequences. The modems negotiate the new rate through a low rate inband control channel.

The impact of the change of line rate on the terminal is at its best just an increased or decreased use of flow control in the data terminal equipment/data communications equipment (DTE/DCE) interface.

In case a change of the data rate is caused from an external element, i.e., an element outside the network concerned, there occurs the problem that the data rate can not be smoothly changed. This is especially a problem when a call is transmitted from one network to another.

An example for a network system in which this problem can occur is shown in FIG. 1.

Reference numeral 1 denotes a radio access network (RAN). This network can be a GSM network or a UMTS network, for example. Reference numeral 2 denotes a mobile station MS which is connected over an air (radio) interface with a base station BS 3 of the radio access network (RAN) 1. The radio access network 1 is controlled by a mobile services switching center (MSC) 4. The MSC 4 controlling the base station 3 comprises an Interworking Function (IWF) controller which performs communication with a second network 5, which is in this embodiment a fixed network, e.g., a Public Switched Telephone Network (PSTN). The fixed network 5 comprises a PSTN network controller 6 in which a modem is included which will be referred to as PSTN modem in the following.

For such a network system, transparent bearer services are defined to support a constant data rate end to end. In a 3.1 kHz audio (=modem) case, this means that the data rate in the GSM traffic channel (between the MS 2 and the MSC IWF 4) and in the PSTN network leg (between the MSC IWF 4 and the PSTN controller) are the same. If this were not the case, data would be lost (due to a buffer overflow) or duplicated (due to a buffer underflow) in the MSC IWF modem.

It is necessary that in both legs data are transmitted using the same data rate. Hence, if in such a case the data rate is to be changed, the quality of service and transmission is affected by this change, since due to changing of the data rate, the data transport can be discontinued, even in the case when the MS 2 and/or the MSC 4 comprise modems which are able to perform a seamless rate change as described above.

DISCLOSURE OF INVENTION

The object underlying the invention is to eliminate the above drawbacks of the prior art and to provide a network system and a method by which the data rate can be changed seamlessly even in a case where data with a new data rate are transmitted and an asynchronous data rate change has to be performed.

This object is solved by a network system, in which data is transmitted in form of transmission frames, comprising a network control unit for controlling communication in the network; and a terminal for receiving and transmitting data from/to said network control unit; wherein said network control unit is adapted to receive a request for changing a data rate from a first user data rate to a second user data rate, said network control unit adds/deletes fill data to/from a transmission frame corresponding to the requested change of said data rate for transmitting data to said terminal at said second data rate; and said terminal is adapted to detect the change in the amount of fill data and to change the user data rate for transmitting data to said network control unit according to the detected change.

Furthermore, the above object is solved by a network control method, in which data is transmitted in form of transmission frames, and a network control unit for controlling communication in the network and a terminal for receiving and transmitting data from/to said network control unit are provided, said method comprising the steps of: receiving a request for changing a data rate from a first user data rate to a second user data rate, adding/deleting fill data to/from a transmission frame correspondingly to the requested change of data rate for transmitting data from said network control unit to said terminal; detecting by said terminal said change in the amount of fill data in said data frame and changing the data rate used by said terminal for transmitting data to said network control unit according to the detected change.

Still further, the above object is solved by a terminal for a network system comprising at least one network control unit and at least one terminal, in which system data is transmitted in the form of transmission frames which may comprise fill data, the terminal being adapted to receive transmission frames from a network control unit; and to transmit transmission frames to said network control unit, wherein the terminal is further adapted to detect a change in the amount of fill data in received transmission frames; and to change a user data rate for the transmission of data to said network control unit according to the detected change.

By the system and the method according to the present invention, it is possible to smoothly change the data rate without affecting the quality of service.

Thus, the system and the method according to the invention enables the use of a seamless rate change (in general the re-negotiation of the data rate) between modems in a transparent mobile data call.

This measure is especially advantageous for video/multimedia services. Namely, a Video/Multimedia service is being specified for GSM and UMTS. It is advantageous for the quality of the service to be able to utilize the Seamless Rate Change functionality of modems in the mobile Video/multimedia calls. The calls can be set up successfully also in cases wherein the modems fail to handshake the maximum line rate (e.g., 28.8 kbit/s). It has to be noted that, in general, the Video protocols can adapt to the reduced or varying data rate.

Further advantageous developments are defined in the dependent claims.

BRIEF DESCRIPTION OF THE DRAWINGS

The present invention will be more readily understood with reference to the accompanying drawings, in which.

BEST MODE FOR CARRYING OUT THE INVENTION

In the following, a preferred embodiment of the invention is described in more detail with reference to the accompanying drawings.

Figure 1:
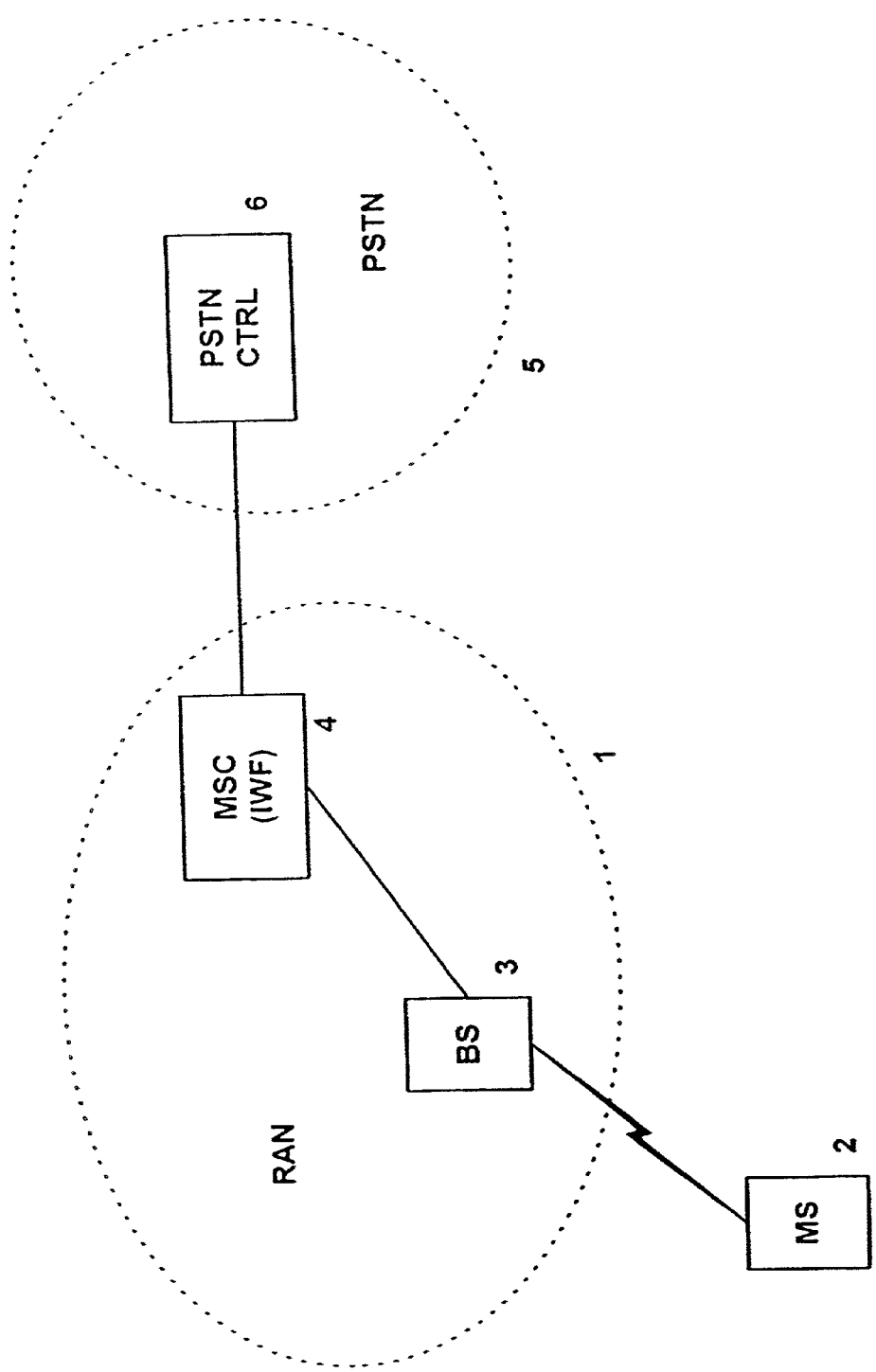
FIG. 1 shows a network system consisting of a mobile and a fixed network.

The system and the method according to the invention can be applied to the network system described with reference to FIG. 1. Thus, a repetition of the detailed description thereof is omitted.

However, it is noted that the term "transmission frame" used in this description is intended to name a transmitted frame which can vary in its length.

Figure 2:
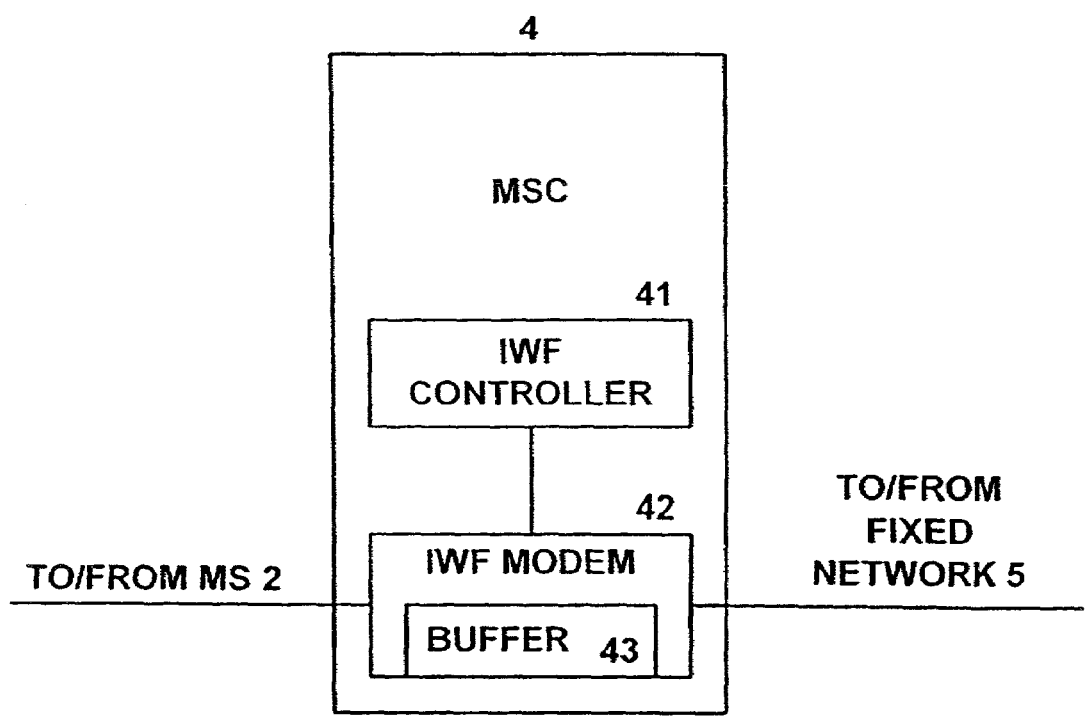
FIG. 2 shows an MSC shown in FIG. 1 in more detail.

FIG. 2 shows the MSC (mobile services switching center) 4 in more detail, wherein for simplicity of the description only the elements necessary for the method according to this embodiment are illustrated.

The MSC 4 comprises an Interworking Function (IWF) controller 41 which controls an IWF modem 42. The IWF modem 42 and the IWF controller 41 actually perform data communication between the mobile network (radio access network RAN, e.g., a GSM or an UTMS network) 1 and the fixed network (e.g., a PSTN network) 5. Thus, the IWF controller 41 and the IWF modem 42 provide an interface between the two networks. Moreover, the IWF modem 42 or the IWF controller 41 includes a buffer 43 which serves to buffer data transmitted from between the two networks.

In a transparent data call, i.e., a call between the mobile station MS 2 connected to the mobile network 1 and a terminal connected to the fixed network 5, the radio interface data rate in the mobile network, i.e. the radio channel configuration, is set up according to the requested or negotiated (with setup signaling) user data rate. The IWF modem 42 is allowed to use the inband data rate negotiation with the PSTN modem. In addition to the normal/standard inband negotiation and rate change procedure the IWF modem 42 indicates the change of the data rate to the data protocol unit which is in this case the IWF controller 41. This indication can be effected for example through a control channel or status signals in the DTE/DCE interface. The data rate change will most probably in practice happen in the beginning of the call when the modems handshake and train, but it may happen during the call too.

In the following, a case is described in which the data rate is changed downwards.

Such a request for a change of the data rate downwards is indicated by the IWF modem 42 on its own initiative or in response to a data rate change in the fixed network 5 controlled by the PSTN controller 6.

The IWF controller 41 goes on using the original rate traffic channel i.e. the original transmission rate of the mobile network 2 but adds fill data in the transmission frames. A user data field in the transmission frames, as indicated above, thereby vary in length.

Figure 3A:
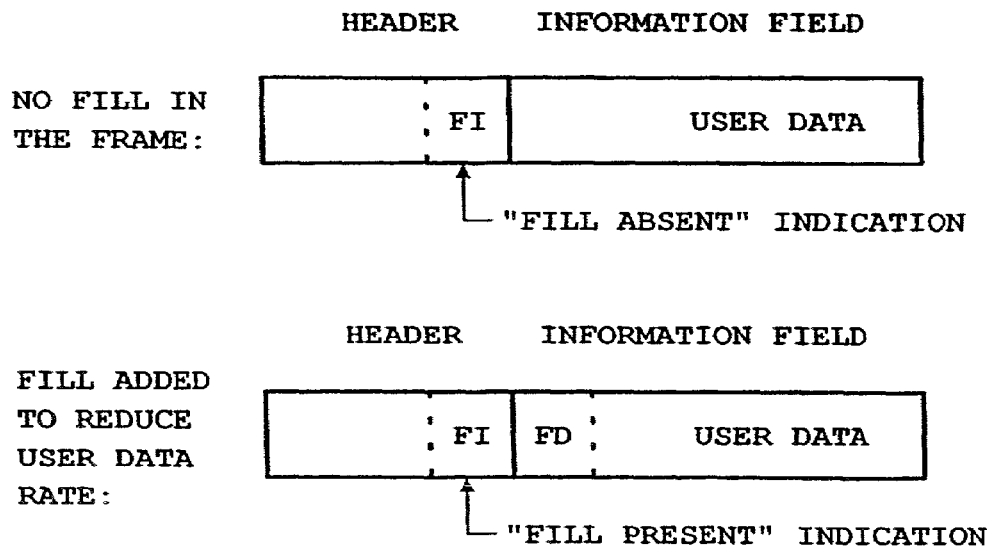
FIG. 3A shows a transmission frame to which fill data are added.

This is described in the following with respect to FIG. 3A. In detail, FIG. 3A shows a transmission frame. Fill indication FI indicates that there is no fill in the frame while using a user data rate DR1 which is the original user data rate used before a request for a data rate change in the mobile network. After a request for a data rate change has been received, the IWF controller 41 adds fill data (dummy data) FD to the transmission frame corresponding to the new user data rate DR2. Thus, the original bit rate i.e. the original transmission rate of the traffic channels can stay unchanged.

The IWF controller 41 indicates the presence and the amount of fill data in the transmission frame by an indicator in the frame. For example, this can be included in redundant bits of the frame structure itself and/or in the added fill data FD. For example, the presence indication FI is in the frame structure and the amount of fill information is within the fill data FD itself.

Figure 4:
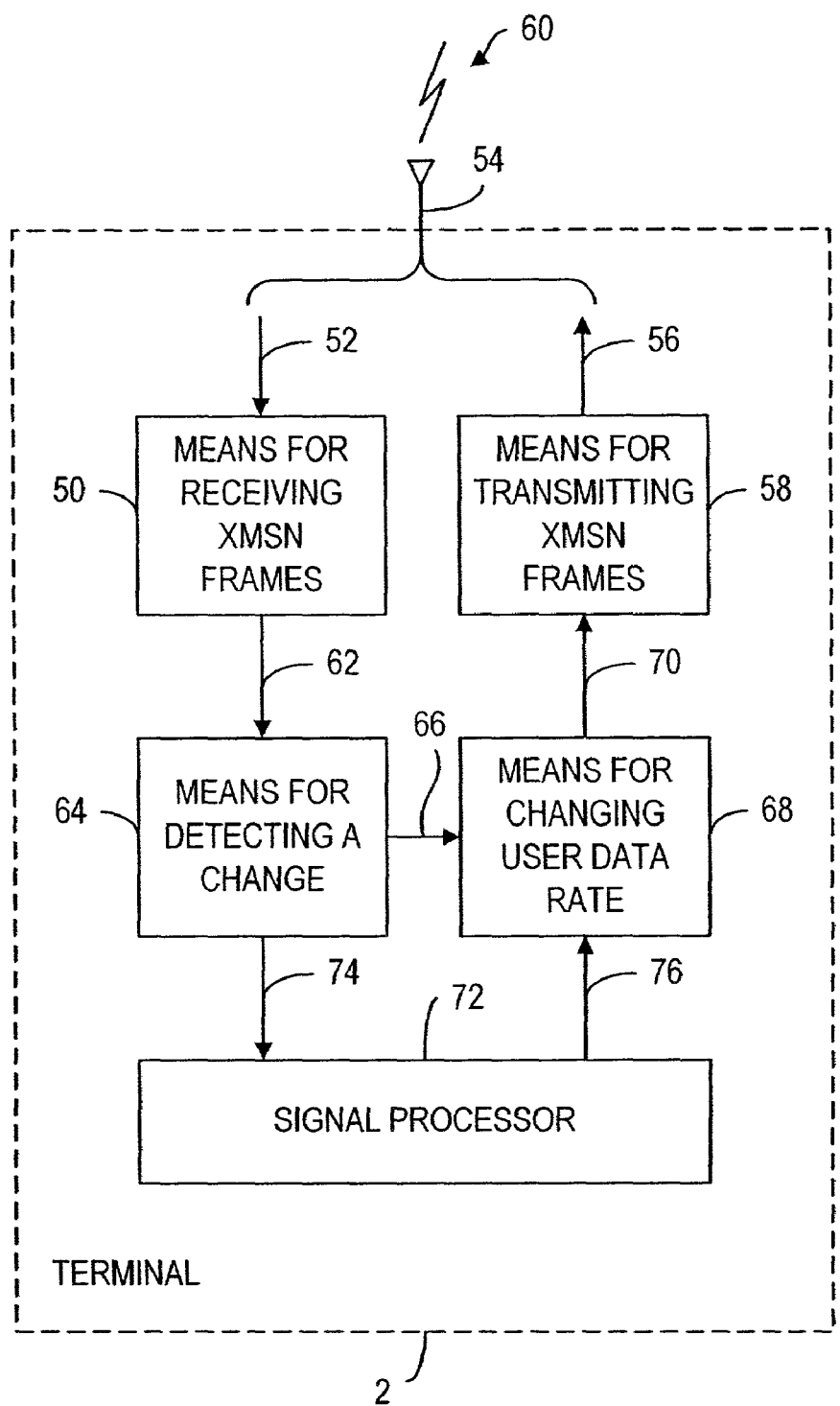
FIG. 4 shows a terminal, according to the invention.

The terminal or mobile station MS 2, as shown in FIG. 4, has means 50 for receiving transmission frames from the network 1 on a line 52 from an antenna 54. Besides simply receiving the signal on the line 52, the means 50 may carry out other signal conditioning functions to condition the incoming signal for further processing but otherwise not related to the present invention. A duplexer (not shown) is provided for providing the signal on the line 52 as well as for receiving a signal on a line 56 from a means 58 for transmitting transmission frames on a radio interface 60 to the base station 3 of the network 1. The means for receiving transmission frames provides same on a line 62 to means 64 for detecting a change in the amount of fill data in the received transmission frames.

The means 64 of mobile station MS 2 detects the fill indications in the received frames and discards the fill such that the user data can be utilized as before. After detecting the fill, i.e., the change of data rate between the modems, the MS 2 starts sending a corresponding amount of fill with the fill indication towards the IWF modem 42. This is indicated in FIG. 4 by the means 64 providing a signal on a line 66 to a means 68 for changing the user data rate provided on a line 70 to the means 58 for transmitting transmission frames. Of course a signal processor will perform other signal processing tasks not related to the present invention in response to incoming transmission frames on a line 74 either from the means 64 or directly from the means 50. Similarly, the signal processor 72 will provide outgoing data on a line 76 to the means 68 for insertion in the information field of the transmission frames. It will be realized that one or more of the functional blocks 50, 58, 64, 68 can be carried out in the signal processor 72.

The IWF modem 42 (or the IWF controller 41) buffers the excessive data in the buffer 43 which data are received from the MS at a higher speed than sent to the fixed network 5 before the MS 2 adapts to the decreased data rate DR2.

The IWF modem 42 controlled by the IWF controller 41 discards the fill received from the MS 2.

After the MS 2 has adapted to the new user data rate DR2, the data can be transmitted within the mobile network by using the new user data rate DR2. Fill is inserted by the transmitting entity (MS, IWF) and removed by the receiving entity (IWF, MS) letting the original bit rate of the traffic channel stay unchanged.

If a further downwards data rate change takes place, more fill (FD) is added using the same procedure.

Next, a case is described in which the data rate is changed upwards.

Such a request is indicated by the IWF modem 42 on its own initiative or in response to detecting a data rate change upwards in the fixed network 5. This can take place if the data rate is lower than the original user data rate negotiated in the corresponding call setup.

The IWF modem 42 goes on using the original rate traffic channel in the mobile network 1 but removes fill in the transmission frames.

Figure 3B:
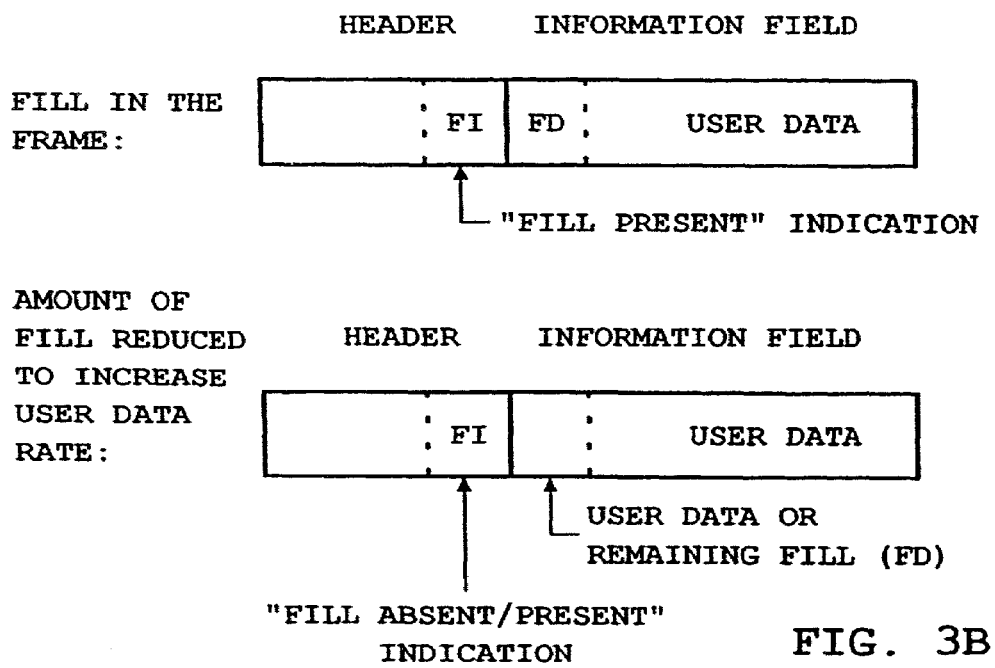
FIG. 3B shows a transmission frame from which fill data are removed.

This is described in the following with respect to FIG. 3B. In detail, FIG. 3B shows another transmission frame. The fill indication FI indicates that there is fill (FD) in the frame (FD itself may contain the length indication at the FD field) while using a user data rate DR1' which is the original user data rate used before receiving a request for a data rate change in the mobile network. After a request for a data rate change has been received, the IWF controller 41 removes fill data (dummy data) FD from the transmission frame corresponding to the new user data rate DR2'. It has to be noted that usually always fill data actually not used may be present in data frames.

In a way analogous to the first case described above, the IWF controller 41 indicates the absence of fill data in the transmission frame by an indicator FI in the frame. For example, this can be included in redundant bits of the frame structure itself, e.g., in the frame header. If the amount of fill is just reduced, the indicator FI indicates the presence of fill (FD) and the amount of the remaining fill is indicated for example by a length indication on the FD field itself.

After detecting the absence or reduction of fill data in the means 64, i.e. the change of data rate between the modems, the means 68 changes the user data rate and MS 2 starts sending transmission frames in which a corresponding amount of fill data are removed towards the IWF modem 42.

The IWF modem 42 (or the IWF controller 41) empties its buffer 43 to compensate for the difference between incoming and outgoing data rates before the MS 2 adapts to the increased data rate. If the IWF buffer 43 is about to run prematurely empty before the adaptation of the MS, the IWF controller 41 sends protocol fill data (e.g., frame delimiters (flags) or supervisory frames) towards the PSTN controller 6 of the fixed network 5.

After the MS 2 has adapted to the new user data rate DR2', the data can be transmitted within the mobile network by using the new user data rate DR2'.

If any fill (FD) is still left, it is inserted by the transmitting entity (MS, IWF) and removed by the receiving entity (IWF, MS), letting the original bit rate of the traffic channel stay unchanged.

Any further upwards data rate change is possible with the same procedure as long as there is fill (FD) left on the transmission frames.

By the above described method, it can be achieved that the connection channel, i.e., the 'leg', between the MSC IWF controller 41 and the MS on the one hand and the connection channel between the MSC IWF controller 41 and the fixed network (i.e., via the PSTN controller 6) can be separated completely. That is, a difference in the data rate can be handled and it is also no problem that both channels ('legs') are protocolwise different. Moreover, the user data rate can change seamlessly, i.e., there is no disruption of the transmission.

In the following, an example of fill indication in a GSM network is described.

In GSM transmission frames, there are currently redundant status (S) bits and redundant frame numbering (#) bits and NIC bits. These bits can be used to indicate the presence/absence of fill data. If the redundant or unused bits are permanently set to ONE, this value can be used as the "absent" value. The more bits are used, the better error protection coding can be used.

In this example, the start of the information field contains the fill data (if there are any present in the frame).

The first bits (with a possible error protection coding) of the fill indicate the length of the fill segment, i.e., they indicate where the actual user data begins in the frame. Various error protection measures can be applied, for example repetition of the length indication. (The repetition method is used in the GSM Facsimile protocol in the BCS signaling phase.)

As is described above, the present invention discloses a network system, in which data is transmitted in the form of transmission frames, comprising a network control unit 4 for controlling communication in the network; and a terminal 2 for receiving and transmitting data from/to said network control unit 4; wherein said network control unit 4 is adapted to receive a request for changing a data rate from a first user data rate to a second user data rate, said network control unit 4 adds/deletes fill data FD to/from a transmission frame corresponding to the requested change of data rate for transmitting data to said terminal 2 at said second data rate; and said terminal 2 is adapted to detect the change in the amount of fill data FD and to change the user data rate for transmitting data to said network control unit 4 according to the detected change. In this system, it is possible to smoothly change the data rate without affecting the quality of service.

The above description and accompanying drawings only illustrate the present invention by way of example. Thus, the embodiments of the invention may vary within the scope of the attached claims.

The invention claimed is:

1. A network system comprising a mobile telecommunication network, in which data is transmitted in form of transmission frames, comprising
   a network control unit for controlling communication in the network; and
   a terminal for receiving and transmitting data from/to said network control unit; wherein
   said network control unit is adapted to receive a request for changing a data rate from a first user data rate to a second user data rate, said transmission frames always contain fill data actually not used, and said network control unit is adapted to add/delete fill data to/from a transmission frame corresponding to the requested change of said data rate for transmitting data to said terminal at said second data rate; wherein said terminal is adapted to detect the change in the amount of fill data and to change the user data rate for transmitting data to said network control unit according to the detected change by adding/deleting fill data in transmission frames corresponding to the requested change of user data rate, and wherein said network control unit is adapted to indicate presence of fill data in a predetermined part of said transmission frame and to indicate an amount of fill data within the fill data of said transmission frame.

2. The network system according to claim 1, wherein the transmission data rate remains unchanged upon the change of the user data rate.

3. The network system according to claim 1, wherein said terminal is adapted to discard said fill data when receiving said transmission frames.

4. The network system according to claim 4, wherein said network control unit is adapted to indicate absence of fill data in a predetermined part of said transmission frame.

5. The network system according to claim 4, wherein said terminal is adapted to detect said second user data rate from said absence/presence and fill data amount indications.

6. The network system according to claim 1, wherein said network control unit comprises a network interworking means which is adapted to provide an interface between said network and a second network.

7. The network system according to claim 6, wherein said interworking means is adapted to receive said request for a data rate change from said second network and/or to initiate said request for a data rate change.

8. A method for controlling a mobile telecommunication network, in which data is transmitted in form of transmission frames, and in which a network control unit for controlling communication in the network and a terminal for receiving and transmitting data from/to said network control unit are provided, wherein said transmission frames contain fill data actually not used, said method comprising the steps of:

receiving, by said network control unit, a request for changing a data rate from a first user data rate to a second user data rate, adding/deleting fill data to/from a transmission frame correspondingly to the requested change of data rate for transmitting data from said network control unit to said terminal;

detecting, by said terminal, said change in the amount of fill data in said data frame and changing the data rate used by said terminal for transmitting data to said network control unit according to the detected change by adding/deleting fill data correspondingly to the requested change of data rate in transmission frames, the method further comprising the steps of indicating presence of fill data in a predetermined part of said transmission frame and indicating an amount of fill data within the fill data of said transmission frame.

9. The method according to claim 8, wherein the transmission data rate remains unchanged upon the change of the user data rate.

10. The method according to claim 8, further comprising the step of discarding said fill data in said terminal when receiving said transmission frames.

11. The method according to claim 8, further comprising the step of indicating absence of fill data in a predetermined part of said transmission frame in case of a upwards change of said data rate.

12. The method according to claim 11, wherein said detection step for detecting said second user data rate is performed by using said absence/presence and fill data amount indications.

13. The method according to claim 8, wherein said network control unit comprises a network interworking means for providing an interface between said network and a second network.

14. The method according to claim 13, wherein said request for a data rate change is received from a second network and/or initiated by said network interworking means.

* * * * *